(12) United States Patent
Hashizume

(10) Patent No.: US 7,446,909 B2
(45) Date of Patent: *Nov. 4, 2008

(54) IMAGE READER FOR USE IN IMAGE FORMING APPARATUS

(75) Inventor: Yusuke Hashizume, Tokyo (JP)

(73) Assignees: Kabushiki Kaisha Toshiba, Tokyo (JP); Toshiba Tec Kabushiki Kaisha, Tokyo (JP)

(*) Notice: Subject to any disclaimer, the term of this patent is extended or adjusted under 35 U.S.C. 154(b) by 479 days.

This patent is subject to a terminal disclaimer.

(21) Appl. No.: 10/878,061

(22) Filed: Jun. 29, 2004

(65) Prior Publication Data

US 2004/0233479 A1  Nov. 25, 2004

Related U.S. Application Data

(62) Division of application No. 09/803,038, filed on Mar. 12, 2001, now Pat. No. 6,771,397.

(51) Int. Cl.
*H04N 1/04* (2006.01)
*H04N 1/40* (2006.01)

(52) U.S. Cl. ............... 358/474; 358/461; 358/496; 358/497

(58) Field of Classification Search ............ 358/474, 358/461, 496, 498, 497, 494, 401, 406, 412, 358/475, 501, 505, 509, 409; 382/274, 312, 382/318, 319; 399/206–209, 211, 212, 367, 399/379

See application file for complete search history.

(56) References Cited

U.S. PATENT DOCUMENTS

| | | | |
|---|---|---|---|
| 5,107,344 A | 4/1992 | Nosaki et al. | |
| 5,453,850 A | 9/1995 | Akuzawa et al. | |
| 5,864,408 A | 1/1999 | Kumashiro | |
| 5,978,614 A | 11/1999 | Takeuchi | |
| 6,606,464 B2 | 8/2003 | Asakawa | |
| 6,650,854 B2 | 11/2003 | Sone | |
| 6,771,397 B2* | 8/2004 | Hashizume | 358/474 |

FOREIGN PATENT DOCUMENTS

JP  9-74465 A  3/1997

* cited by examiner

*Primary Examiner*—Cheukfan Lee
(74) *Attorney, Agent, or Firm*—Foley & Lardner LLP

(57) ABSTRACT

The image reader according to the present invention is able to set the accurate threshold level free of influence of dirt and dust even when the reference "white" level is requested for shading correction during the acceleration while the carriage is being accelerated without increasing the averaging frequency when the reflected light from the white board is read for shading correction. In addition, because the distance between the head end of the transparent glass and the home position as well as the distance between the home position and the reading window are shortened, the size of the image reader is reduced.

5 Claims, 6 Drawing Sheets

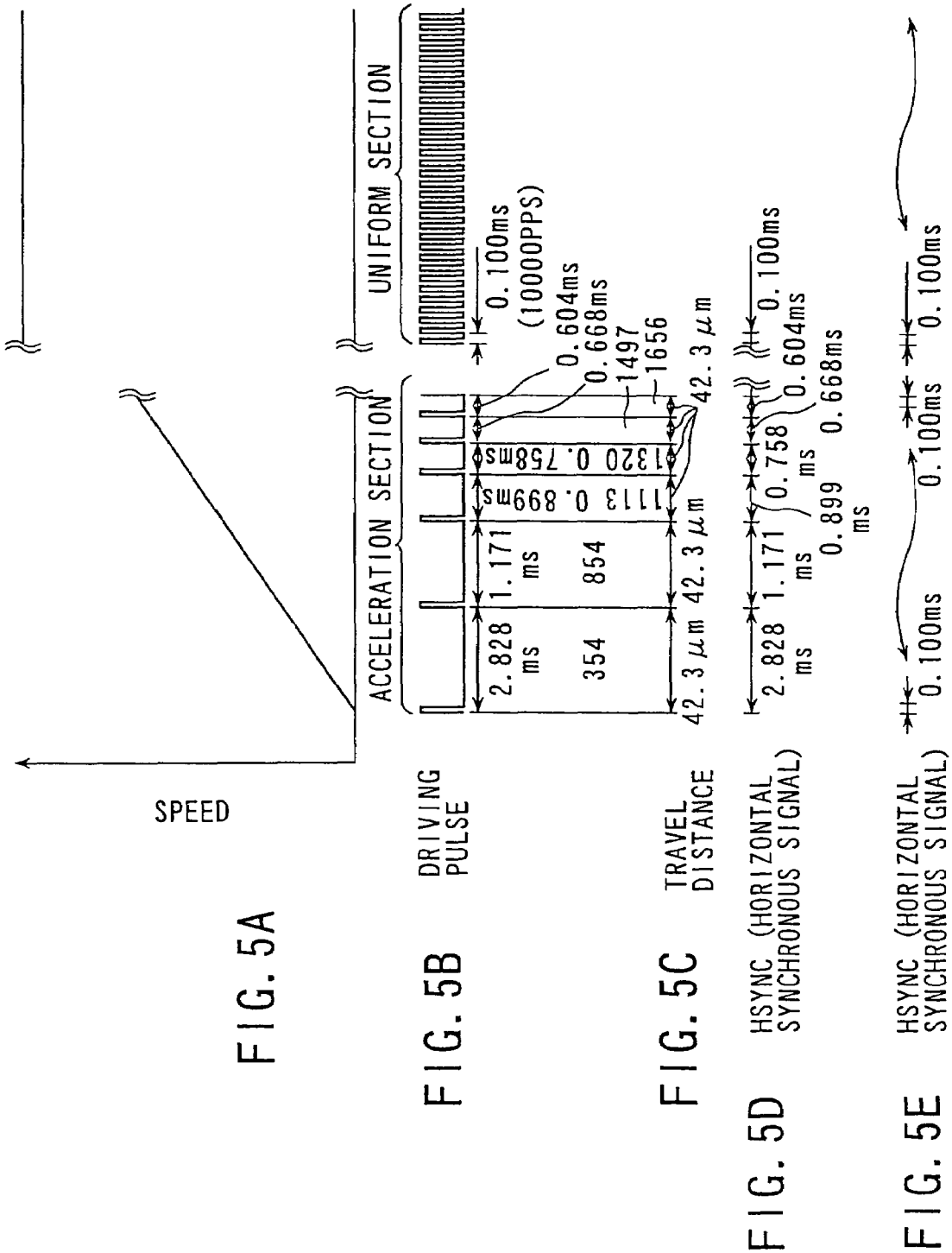

IMAGE READER FOR USE IN IMAGE FORMING APPARATUS

The present application is a divisional of U.S. application Ser. No. 09/803,038, filed Mar. 12, 2001, now, U.S. Pat. No. 6,771,397, issued Aug. 3, 2004, the entire contents of which are incorporated herein by reference.

BACKGROUND OF THE INVENTION

The present invention relates to an image reader for obtaining the image data for image forming apparatus of, for example, electrophotographic system and to an image forming apparatus that is provided with the image reader.

The image reader photoelectrically converts reflected light obtained by illuminating the object being read such as a sheet-form document or book, or solid body, and so forth by the image reader sensor such as a charge-coupled device (CCD) sensor, and the like, and output the image data.

For the image reading method by the image reader, there are two systems: one a flat bed mode in which a original document is allowed to be at rest on a transparent document holding section (transparent glass) and an optical system such as a lighting device and a mirror, and the like or an image reader sensor is moved along the transparent glass and the other a sheet-through mode in which an optical system such as a mirror, and the like or image reader sensor and the illuminating device are fixed to a specified location in advance, the reading position is defined, sheet-form objects to be read are transferred successively to the reading position. Today, in many of the image readers, in order to enable the above-mentioned two reading systems, together with the transparent glass, a reading position for sheet-through that enables sheet-through is provided. Consequently, the reading position for sheet-through is generally defined to be the specified position further remote from the head end of the transparent glass which is the acceleration section used for acceleration when the optical system such as an illuminating device and a mirror, and the like or an image reader sensor travels in the flat bed mode.

Next, the basic configuration of the image reader of a flat bed mode that enables sheet-through will be described.

When the flat bed mode is adopted, the following system is used; a carriage holding the illuminating device and mirror, and the like that can illuminate the reading width, the total length of one side (width) direction of transparent glass is allowed to travel at a specified speed with a specified interval made with the transparent glass held along the reading length, the total length of the other one side (length) that intersects the reading width at right angles, and using a lens, and the like, the reflected light from the object to be read (illuminated by the illuminating device) is transmitted to the CCD sensor fixed to the position which do not interfere with the carriage travel.

On the other hand, when the image data of the sheet-form original document is obtained by the sheet-through mode, the carriage is fixed opposite to the transparent glass at the specified position where the reflected light from the reading position is able to be guided to the CCD sensor and the object to be read is conveyed to the reading position successively.

Now, in the image reader, in order to correct shading when the image of the object to be read is converted to the image data, the shading data is generated from the reflected light obtained by illuminating the white board of the specified brightness that serves as the standard for shading correction and then, shading of the read image is carried out. In addition, when the shading data is generated, the data for several lines (in the length direction) are generally balanced for each pixel (in the width direction) to prevent influences of dirt, dust, and the like (dirt, dust, and the like are read as the image).

Consequently, in general, while the carriage is being moved at the constant speed, the reflected light is read from the white board for shading correction. By the way, in the image reader as described above, the carriage is accelerated at the specified acceleration in such a manner that the carriage is moved along the transparent glass, that is, the object to be read (in such a manner that the carriage reaches to the specified speed (constant speed) when the carriage in motion reaches the glass end section) as the carriage begins to travel from the home position, the travel starting position. By the way, the home position is, in general, set at the specified location between the white board for shading correction and the reading position (for the sheet-through mode). Consequently, the time for reading the reflected light from the white board for individual lines (in the length direction) is set to the constant value in accordance with the cycle of the horizontal (reading length) synchronous signal (referred to as the "H-SYNC signal") irrespective of the reading speed, that is, the speed at which the carriage is moved in the reading length (horizontal) direction.

However, when the home position is located in the vicinity of the white board as described above, there is a problem in that the distance between the home position and the transparent glass head end is long and the time required for first scan is long (first scan is unable to be shortened) because in the flat bed mode, the carriage is maintained temporarily to the constant speed for acquiring the shading data by the white board in the midst of acceleration from the home position and then, is accelerated to the reading speed in the section up to the transparent glass head end (there are cases in which the carriage is accelerated to the reading speed when the carriage is allowed to pass the white board).

In addition, when the image data is obtained by sheet-through in the image reader described above, there is also a problem in that the first scan time becomes still longer than in the flat bed mode because the carriage must be returned to the reading position for sheet-through after the carriage is temporarily allowed to pass the shading position opposite to the white board to obtain the shading data.

By the way, in the high-speed image reader of the flat bed mode, there is a case in which the carriage is unable to be accelerated to the specified reading speed in the section up to the transparent glass head end because the carriage is moved at a constant speed in the section opposite to the white board in order to obtain the shading data, and as a result, a problem in that the size of the image reader becomes large arises.

BRIEF SUMMARY OF THE INVENTION

Accordingly, it is an object of the present invention to provide an image reader that can shorten the first scanning time required for the carriage to move from the home position to the start of image reading in an image reader provided with a carriage to move the illuminating device.

It is another object of the present invention to provide an image reader comprising:

a CCD sensor for converting an image of an object to be read to image data of electrical signals;

a transparent glass for holding the object to be read;

a mirror set includes one or more mirrors, and is able to move along the transparent glass, for transmitting the image of the object to be read to the CCD sensor;

an illuminating device is moved along the transparent glass together with the mirror set and illuminates the object to be read held to the transparent glass;

a carriage member for supporting the mirror set and the illuminating device, which moves at a specified speed along the transparent glass by external driving force, and for indicating an own position by a marker member mounted on its own specified position;

a white reference provider for providing white reflected light that serves as a reference for defining a threshold level when the CCD sensor outputs the image data;

a home position sensor for detecting the marker member of the carriage member and setting the wait position of the mirror set and the illuminating device;

a reading window that is arranged at a specified position in a direction away from the transparent glass with the white reference provider set at the center in a plane defined by the white reference provider as well as the transparent glass and enables the image of the object to be read to be transmitted to the CCD sensor through the mirror set by feeding of the object to be read independently from the object to be read set on the transparent glass; and a drive unit for moving the carriage member at a predetermined speed and setting the position of the carriage member in such a manner that, at the wait time, the reflected light from the white reference provider is guided to the mirror of the mirror set supported on the carriage member, to which the reflected light from the object to be read is first transmitted.

It is a further object of the present invention to provide an image reader comprising:

a CCD sensor for converting an image of the object to be read to the image data of electrical signals;

a transparent glass for holding the object to be read;

a mirror set includes one or more mirrors, and is able to move along the transparent glass, for transmitting the image of the object to be read to the CCD sensor;

an illuminating device is moved along the transparent glass together with the mirror set and illuminates the object to be read held to the transparent glass;

a carriage member for supporting the mirror set and the illuminating device, which moves at a specified speed along the transparent glass by the external driving force, for indicating an own position by a marker member mounted on its own specified position;

a white reference provider for providing the white reflected light that serves as a reference for defining the threshold level when the CCD sensor outputs the image data;

a home position sensor for detecting the marker member of the carriage member and setting the wait position of the mirror set and the illuminating device;

a reading window that is arranged at a specified position in the direction away from the transparent glass with the white reference provider set at the center in a plane defined by the white reference provider as well as the transparent glass and enables the image of the object to be read to be transmitted to the CCD sensor through the mirror set by feeding of the object to be read independently from the object to be read set on the transparent glass; and a drive unit for moving the carriage member at a specified speed in the section opposite to the transparent glass, and at the wait time, setting the position of the carriage member in such a manner that the reflected light from the white reference provider is guided to the mirror, to which the reflected light from the object to be read of one or more mirrors of the mirror set supported on the carriage member is first transmitted, and moving the carriage member towards the transparent glass side and accelerating the carriage member to the specified speed until the carriage member faces opposite to the transparent glass head end when the instruction is given to read the image of the object to be read set on the transparent glass, and driving the carriage member to the reading window, that is, towards the direction opposite to the transparent glass and stopping the carriage member at the position opposite to the reading window.

It is an additional object of the present invention to provide a method for driving an image reader that guides the reflected light from the white reference provider to the mirror of one or more mirrors of the image reader to which the reflected light from the object to be read is first transmitted and defines the threshold level comprising the steps of:

moving the mirror set that can transmit the reflected light from the band-form region illuminated by the illuminating device that can provide a band-form illuminated light extended in the first direction and having the specified length in the second direction intersecting to the first direction by the use of the mirror set with a plurality of mirrors extended in the first direction and having a specified length in the second direction as well as the carriage member containing the illuminating device along the image of the object to be read, moving the carriage member at the wait time in such a manner that the rough center of the mirror in the second direction to which the reflected light is first transmitted from the object to be read of the mirror set is opposite to the rough center of the white reference provider in the second direction for providing the white reflected light that serves as the reference to define the threshold level for CCD sensor to output the image data, and moving the carriage member at a specified speed in the section opposite to the transparent glass, moving the carriage member towards the transparent glass side and accelerating the carriage member to the specified speed until the carriage member becomes opposite to the transparent glass head end when the instruction is given to read the image of the object to be read set to the transparent glass, and driving the carriage member towards the reading window and stopping the carriage member at the position opposite to the reading window when the instruction is given to read the image of the object to be read conveyed to the reading window.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 5A is a schematic representation illustrating the relationship between the carriage acceleration time and the speed in the image reader shown in FIGS. 2 and 3;

FIG. 5B is a schematic representation illustrating changes of pulse width of the drive pulse fed to the drive motor (pulse motor) for accelerating the carriage shown in FIG. 5A;

FIG. 5C is a schematic representation illustrating the distance the carriage is moved (per drive pulse width) by the rotation of the-motor achieved by the drive pulse of the pulse width shown in FIG. 5B;

FIG. 5D is a timing chart illustrating the output timing, that is, H-SYNC intervals, fed to the CCD sensor during carriage acceleration shown in FIG. 5A;

FIG. 5E is a timing chart illustrating the output timing, that is, H-SYNC intervals, fed to the CCD sensor during carriage acceleration of the known image reader;

DETAILED DESCRIPTION OF THE INVENTION

Referring now to drawings, a digital duplicator will be described as one example of the image forming apparatus to which the embodiment of the present invention is applied.

Figure 1:
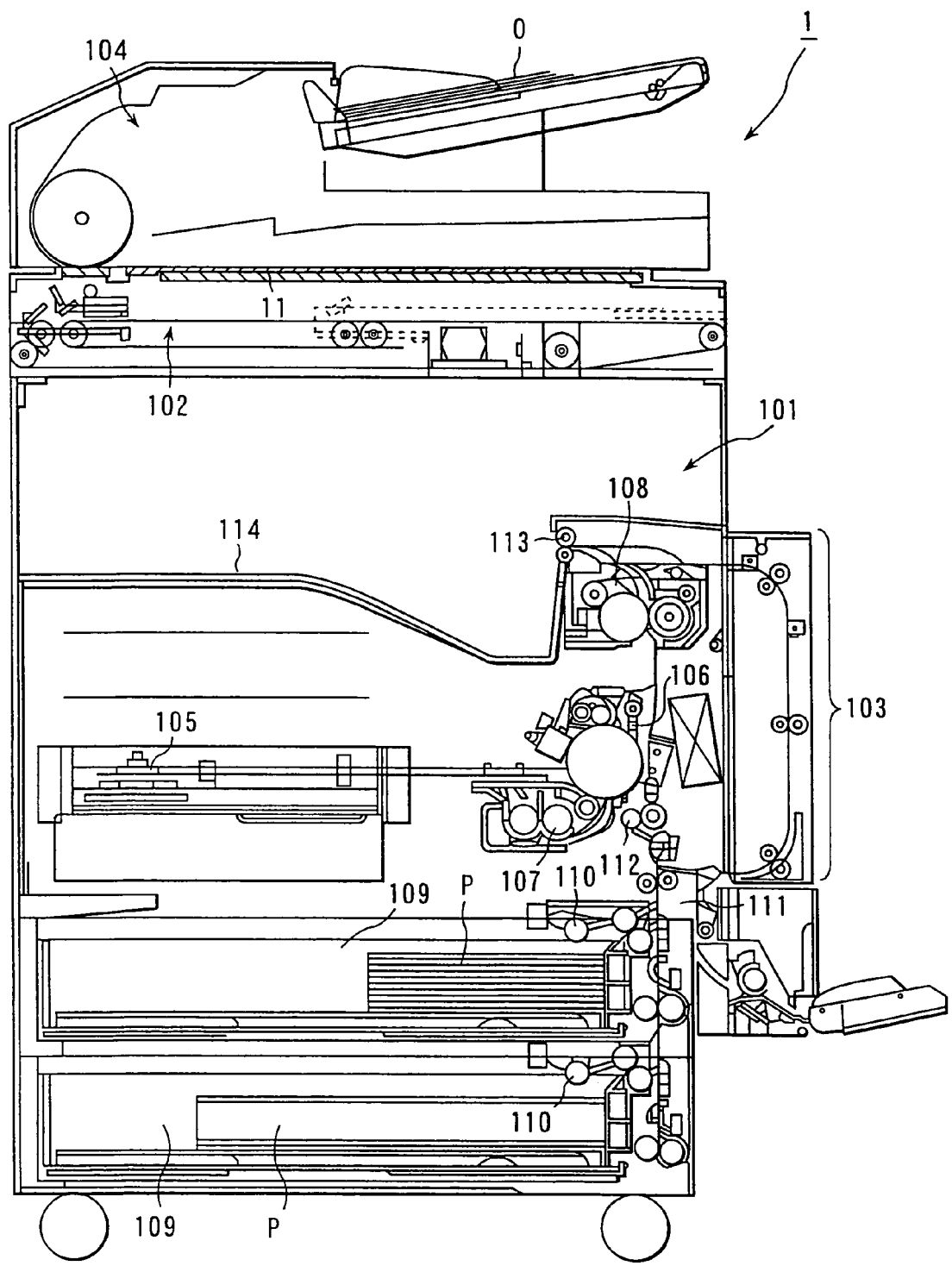
FIG. 1 is a schematic representation illustrating the one example of the image forming apparatus to which the image reader of the present invention is incorporated.

As shown in FIG. 1, the digital duplicator 101 comprises an image reader 102 for optically taking in the image of the duplication (reading) object to be read O as light and shade of the light and obtaining the image data, and an image forming section 103 for forming the image corresponding to the image data supplied from the imager reader 102 or the outside.

To the image reader 102, an automatic document feeder (ADF) 104 is integrally provided for replacing the object to be read of duplication O in linkage with the image reading operation at the image reader 102 when the object to be read of duplication (original document of reading) O is of a sheet form.

The image forming section 103 comprises an exposing device 105 for irradiating the laser beam corresponding to the image data fed from the image reader 102 or the external device, a photosensitive drum 106 for generating and holding the image that corresponds to the laser beam from the exposing device 105, a developing device 107 for feeding a developing agent (toner) to the image formed on the photosensitive drum 106 and developing the image, a fixing device 108 for heating and melting the toner image and transferring material with the developing agent image, that is, the toner image, on the photosensitive drum 106 developed by the developing device 107 transferred to the transferring material (sheet material) P fed by the paper conveying section later described and fixing the image onto the transferring material P, and other components.

When the image data is fed from the image reader 102 or the external device, the laser beam with the intensity varied in accord with the image data is irradiated from the exposing device 105 onto the surface of the photosensitive drum 106 charged in advance to the specified potential. By this operation, on the photosensitive drum 106, an electrostatic latent image corresponding to the image to be copied is formed on the photosensitive drum 106.

The electrostatic latent image formed on the photosensitive drum 106 is developed by the tones selectively supplied by the developing device 107 and converted into the toner image not illustrated. The toner image not illustrated and formed on the photosensitive drum 106 (with no symbol assigned) is taken out one by one by from the cassette 109 that holds the sheet materials P, the transferring material, by pickup rollers 110, conveyed to the conveying route 111 up to the photosensitive drum 106, has the timing matched with the toner image on the photosensitive drum 106 by the aligning roller 11 for aligning the position of the toner image formed on the photosensitive drum 106 to that of the sheet material, and the electrostatic latent image is transferred to the sheet material P at the transferring position.

The toner transferred to the sheet material P is conveyed to the fixing device 108, heated and melted by the fixing device 108, fixed to the sheet material P, and discharged to the exhaust space (discharged document tray) 114 defined between the image reader 102 and the cassette 109.

Figure 2:
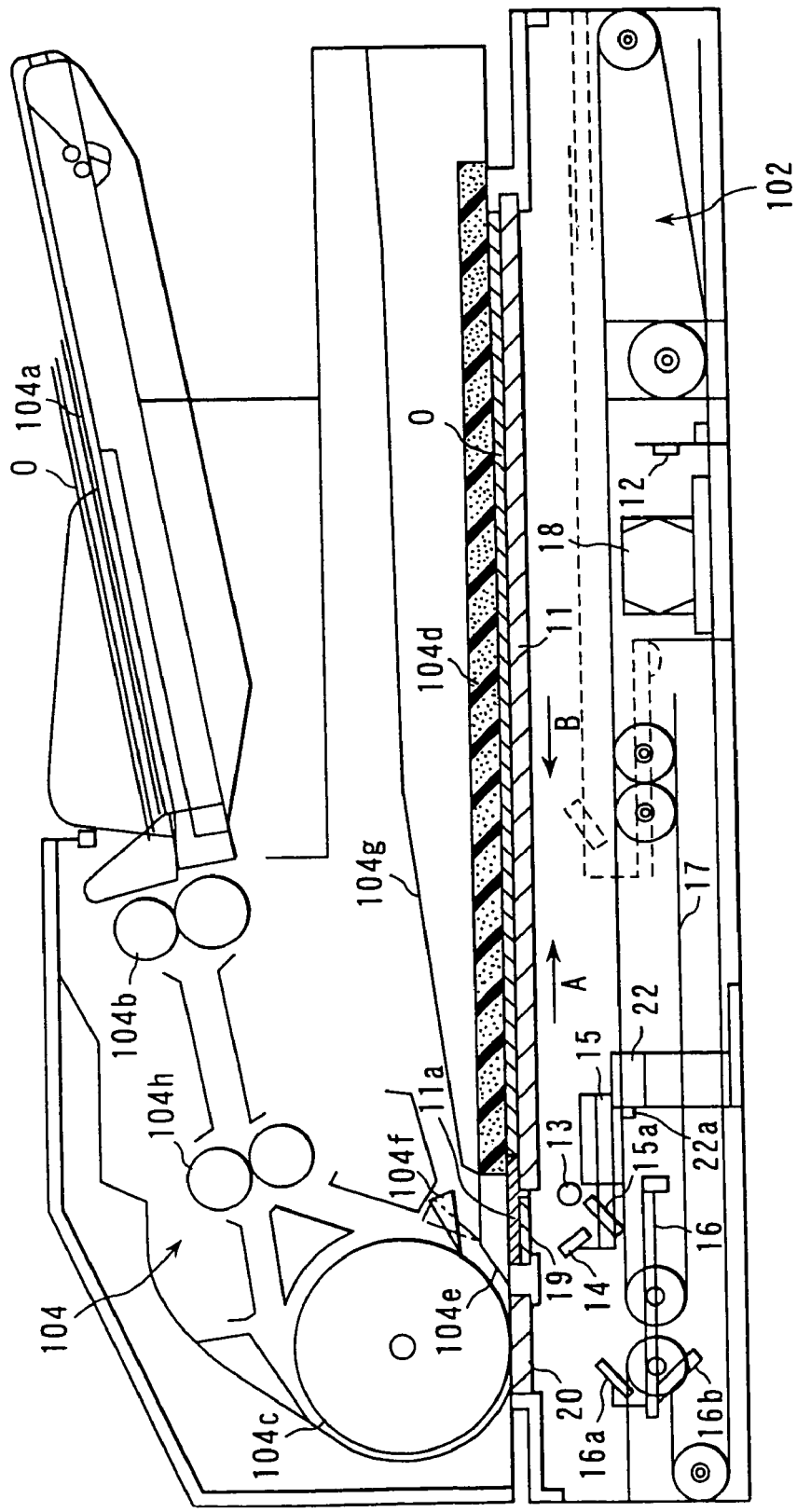
FIG. 2 is a schematic representation illustrating the home position of the image reader that can be utilized integrally with the image forming apparatus shown in FIG. 1;.
Figure 3:
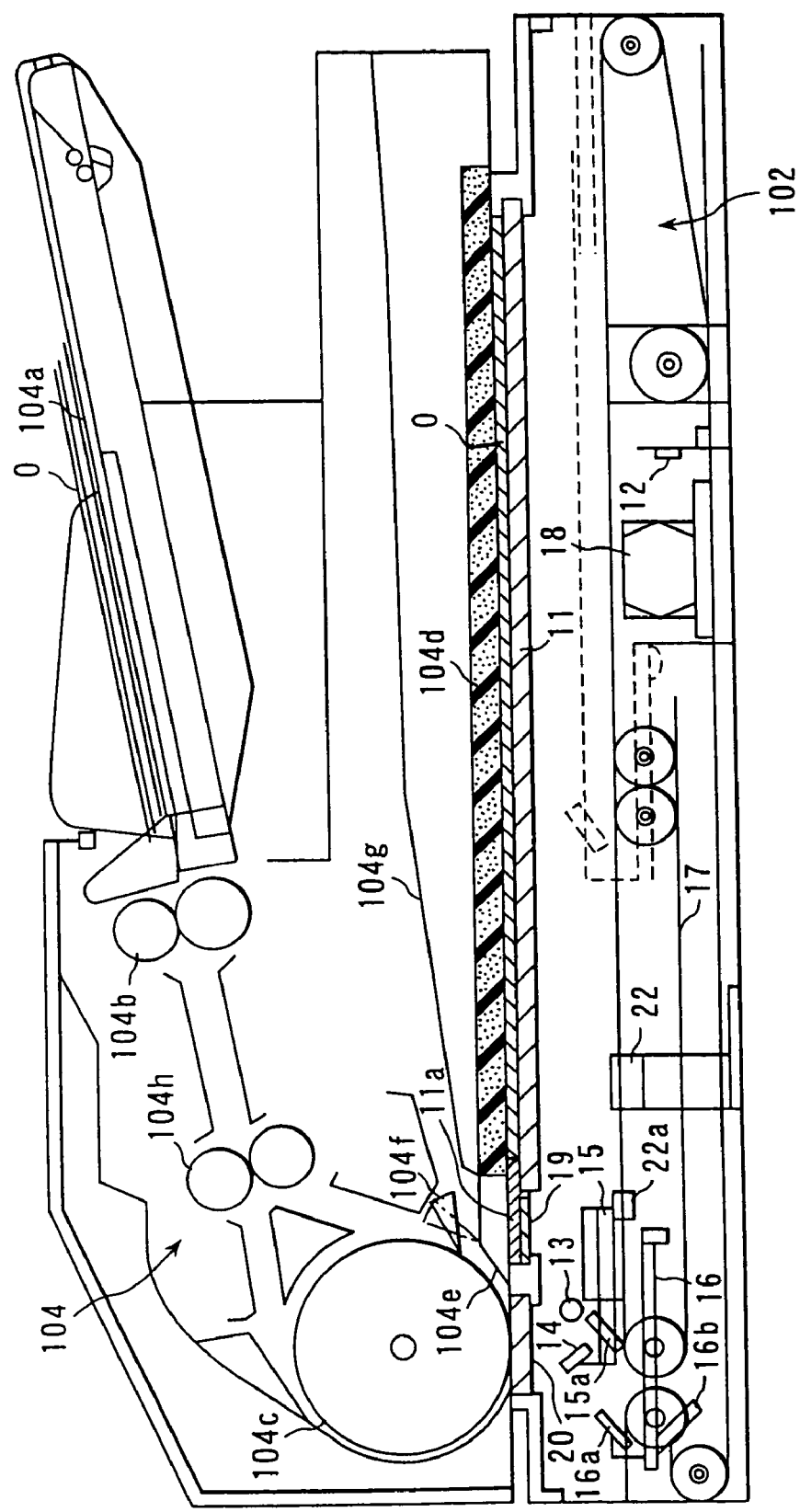
FIG. 3 is a schematic representation illustrating one example of the sheet-through mode operation of the image reader shown in FIG. 2.
Figure 4:
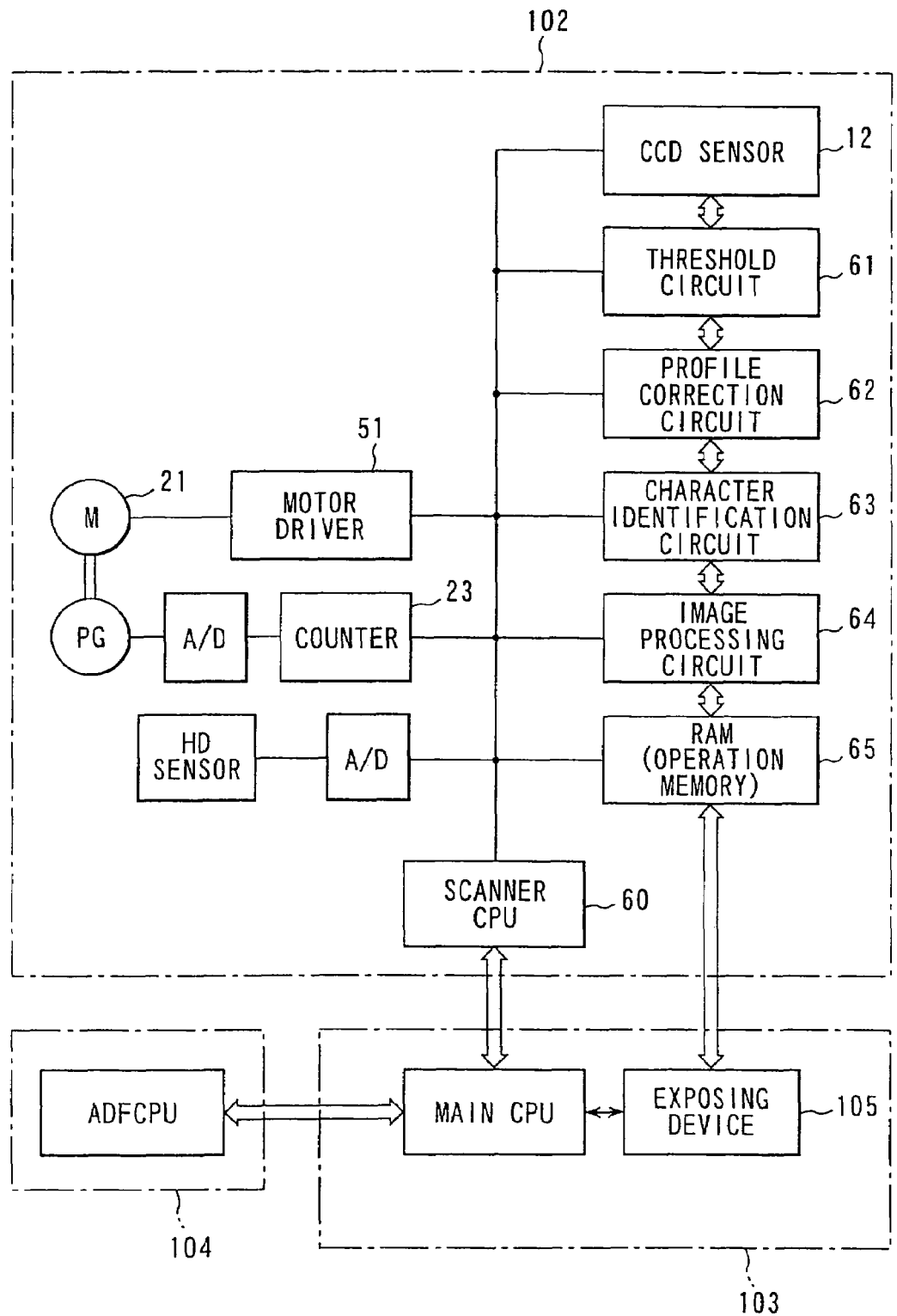
FIG. 4 is a block diagram showing one example of the control system of the image reader shown in FIGS. 2 and 3.

FIGS. 2 and 3 are schematic representations for illustrating one example of the image reader integrally usable with the image forming apparatus shown in FIG. 1. FIG. 4 shows the control block.

As shown in FIGS. 2 and 3, at the specified position of the image reader 102, a transparent glass 11, which is a transparent sheet-form flat material with generally uniform thickness, for holding the object to be read O, the object to be read to be copied, and CCD sensor 12 for converting the image of the object to be read set to the transparent glass 11 into electrical signals, that is, image data, are mounted. To one end of the transparent glass 11, a size plate 11a for showing the position to set the object to be read O to the transparent glass 11 is installed. In addition, the object to be read O set at the specified position on the transparent glass 11 is allowed to closely adhere to the transparent glass by ADF 104.

In the space near the surface of the transparent glass 11 opposite to the surface to which the object to be read O is set, there installed are a tubular illuminating lamp 13 that is extended along the direction of one side (depth) of the transparent glass and illuminates the object to be read O on the transparent glass 11 and a reflector 14 that reflects the light from the illuminating lamp 13 against the object to be read on the transparent glass 11.

The illuminating lamp 13 and the reflector 14 are fixed to the first carriage 15 movable along the surface of the transparent glass 11. The first carriage 15 is moved at a specified speed in the direction of the other side (length) that intersects one side of the transparent glass 11 at right angles. Consequently, the image of the object to be read O is taken out as light and shade of the light with respect to the slender region in the depth (first) direction defined by the illuminating light and is reflected successively by a plurality of mirrors later discussed, and guided to the light-receiving surface of the CCD sensor 12. By allowing the illuminating lamp 13 and the reflector 14, that is, the first carriage 15, to be moved in the length (second) direction, the image of the whole area of the object to be read O is taken out as light and shade of the light successively and guided to the light-receiving surface of the CCD sensor 12.

To the first carriage 15, the first image mirror 15a is further mounted for guiding light and shade of the light arising from the difference of reflection factor between the image and the non-image of the object to be read O to a specified direction, by illuminating the image light of the object to be read O which is the reflection light reflected at the object to be read O illuminated by the direct illuminating light from the illuminating lamp 13 and the reflected illuminating light reflected by the reflector 14, that is, the object to be read O with the image to be read.

To the direction in which the image light reflected at the first image mirror 15a of the first carriage, the second image mirror 16a and the third image mirror 16b are mounted for guiding the image light from the first image mirror 15a successively in the specified direction. The second and the third image mirrors 16a, 16b are arranged in such a manner that the relevant reflection surfaces make an angle 90°. Consequently, the reflected light from the object to be read O guided by the first image mirror 15a of the first carriage 15 is turned back to the plane inside parallel to the plane direction of the transparent glass 11 by the second and the third image mirrors 16a, 16b of the second carriage 16. The reflected light from the third image mirror 16b is a band-form light restricted by the total axial length of the illuminating lamp 13 and the width defined when the first image mirror 15a reflects the image light from the object to be read O. The first and the second mirrors 16a, 16b are loaded to the second carriage 16 that is mobile by being driven by the first carriage 15. The first carriage 15 and the second carriage 16 are applied with the thrust from the driving motor described later so that the second carriage 16 moves at the speed ½ that of the first carriage 15 by the wire 17 whose both ends are fixed to the specified positions of the housing of the image reader 102.

In the direction to which the image light reflected at the third image mirror 16b of the second carriage 16, a lens 18 is installed for providing a specified contraction magnification to the image light reflected at the third image mirror 16b. At the focus position of the lens 18, a CCD sensor 12 which has a light receiving surface (not designated with a reference character) for receiving the light, photoelectrically converts the image light with which the light-receiving surface is irradiated, and outputs electrical signals, that is, image data that corresponds to the intensity of the image light is arranged in such a manner that the light-receiving surface is located at the focus position of the lens 18.

On the back surface of the size plate 11a mounted at the end section of the transparent glass 11, that is, on the surfaces on the sides of the first and the second carriage 15, 16, a white board (white reference board) 19 is installed for inputting the white level reference value to the CCD sensor 12 when the CCD sensor 12 photoelectrically converts the image of the object to be read O. The white board 19 is not always installed to the back surface of the size plate 11a but may be arranged at the specified position of the region outside of the circumferential section of the housing of the image reader under which the first and the second carriages 15, 16 take shelter, that is, the head end section of the transparent glass 11 (head end section of the object to be read O).

At the specified position which is more on the circumferential side of the housing of the image reader 102 than at the end section of the transparent glass 11 and more on the end section side of the housing than the white board 19 discussed above, there installed is a reading window 20 that enables the reading of the image by the sheet-through mode that can convey the object to be read O only and guide the image of the object to be read O to the CCD sensor 12 without moving the two carriages 15, 16 along the transparent glass 11 when the object to be read O is of a sheet form that can be fed by the use of ADF 104.

The reading window 20 is a slender sheet-form material that is formed with the material similar to the transparent glass 11 and extends to the depth direction (first direction), and is used for obtaining the reflected light of the image of the object to be read O by irradiating the sheet-form object to be read O conveyed one by one by the use of ADF 104 using the light from the illuminating lamp 13 loaded to the first carriage. The reading window 20 enables the sheet-form object to be read O currently under conveyance to be irradiated with the illuminating light from the illuminating lamp 13 loaded to the first carriage when one or a plurality of sheet-form object to be read O set to the document tray 104a of ADF 104 are conveyed by the feed roller 104b, and in the present invention, the reading window is located at the position opposite to the lowermost section of the conveyor roller 104 of ADF 104. On the plane surface section that accounts for the majority of ADF 104, a sponge (foam rubber) sheet 104d is installed for bringing the object to be read O to be set on the transparent glass 11 in close contact with the transparent glass 11.

In this way, by installing the transparent glass 11 that can carry books and solid bodies in addition to the sheet-form objects to be read O and the reading window 20 that can shorten the time required for reciprocating motion of the first and the second carriages 15, 16, in particular, for the carriage (15, 16) return (return path) by conveying the sheet-form object to be read O only, which can be used only when the object to be read O is of the sheet form only, the reading time required for reading the image can be shortened in accord with the characteristics of the profile of the object to be read O.

Referring now to FIGS. 2 and 3, description will be made on the image reading operation in the flat bed mode in which the object to be read is set on the transparent glass and the image is read and the sheet-through mode in which the object to be read is conveyed to the reading window and the image is read, respectively.

FIG. 2 illustrates the positional relationship between the first and the second carriages 15, 16 in the ready (wait) condition of the image reader 102.

As shown in FIG. 2, the first carriage 15 is stopped with the widthwise center of the first image mirror 15a positioned right below the white plate 19 at the ready time by the light-shielding plate 22a for the home position sensor of the first carriage 15 being detected by the home position sensor 22 (hereinafter called the HP sensor 22).

The first carriage 15 is moved to the specified position in such a manner that the rough lengthwise center of the white board 19 used for the reference for shading compensation generally coincides with the lengthwise center of the first image mirror 15 by driving the drive motor 21 (see FIG. 4) in the specified direction while the image forming section 103 is being warmed up in conformity to the initial routine by the control of the scanner CPU60 in accordance with the initial program stored in advance in RAM61 by energizing the image forming apparatus 101.

In detail, the wire rope 17 wrapped around a pulley not illustrated of the driving motor 21 is moved to change the relative position of the pulley with respect to the total length of the wire rope 17 by the rotation of the pulley not illustrated in the specified direction; then, the first carriage 15 is moved to a specified distance in the arrow A direction along the transparent glass 11, and the driving motor 21 is rotated in the reverse direction by the number of pulses generated at the pulse generator (hereinafter called "PG") and counted by the counter 23 in the time from when the specified time elapses when the light shielding plate 22a is detected by the HP sensor 22 until the rotation of the driving motor 21 stops after the light shielding plate 22a of the first carriage 15 is detected at the HP sensor 22 after the light shielding plate 22a is stopped; then, the first carriage 15 is stopped with the light-shielding plate 22a re-detected by the HP sensor 22. Needless to say, since the second carriage 16 is moved in the distance ½ as compared to the distance in which the first carriage 15 is moved at the speed ½ as compared to the speed at which the first carriage 15 is moved by the wire rope 17, the positions of both carriages are generally able to be detected by either the first carriage 15 or the second carriage 16 and the HP sensor 22. The driving motor 21 is a pulse motor whose rotation rate (angle) and the rotating speed are accurately controllable.

Next description will be made on one example of the image reading of the flat bed mode from the ready condition in which the first carriage 15 is located right below the white board 19 for shading compensation.

By the user, ADF 104 is released from the reading position opposite to the transparent glass 11 and the object to be read O is set to the transparent glass 11. In such event, when the object to be read O is of the sheet form, in many cases, the head end section of the object to be read is brought to collide with the size plate 11a. When the object to be read O is a solid body, it is needless to say that part of the object to be read O does not always need to come in contact with the size plate 11a.

Thereafter, the reading start key not illustrated is turned on (or reading is instructed by the external device not illustrated); the illuminating lamp 13 of the first carriage goes on, and the white board 19 is illuminated by the lamp 13 and the reflector 14. Consequently, the reflected light is generated from the white board 19, and the reflected light is guided to the lens 18 via the first image mirror 15a, the second image mirror 16a, and the third image mirror 16b, and is given the specified convergence by the lens 18, and the image is formed on the light-receiving surface of the CCD sensor 12.

Simultaneously, by the control of the motor driver 51, the driving motor 21 is rotated in such a manner that the first and the second carriages 15, 16 are moved in the arrow A direction, and is accelerated to reach the specified speed reading at the head end of the transparent glass as it is. By this, the reflected light from the white board 19 incidence on the light receiving surface of the CCD sensor is the varying areas illuminated per unit time. Consequently, the reflected light from the white board 19 incidence on the CCD sensor 12 is sampled at the timing described later using FIGS. 5A to 5D.

Then, the specified level of the output signal from the CCD sensor 12 is set as a threshold by the threshold circuit 61 (see FIG. 4) and the compensation rate for shading compensation is established (the light intensity of illuminating light from the illuminating lamp 13 is constant).

Thereafter, by moving the first and the second carriages 15, 16 at a specified speed as the relative position of the wire rope 17 changes by rotation of the driving motor 21, the whole area of the object to be read O on the transparent glass 11 is successively illuminated by the slender band-form illuminating light in the depth direction from the illuminating lamp 13 and the reflector 14.

Simultaneously, the reflected light from the object to be read O is reflected successively at the first image mirror 15a, the second image mirror 16a, and the third image mirror 16b, and is given the specified convergence by the lens 18, and the image is formed successively on the light-receiving surface of the CCD sensor 12.

The reflected light from the object to be read O guided to the CCD sensor 12 is photoelectrically converted to the current value corresponding to the light intensity of the reflected light of the CCD sensor 12, and after the specified level of the current value is set as a threshold by the threshold circuit 61, the reflected light is converted to the voltage, and after the reflected light is recognized as the character information and image information through the profile correction circuit 62, character specifying circuit 63, and image processing circuit 64, and the like, the reflected light is stored in the work memory (RAM) 65 as the image data.

The image data stored in RAM 65 is supplied to the exposing device 105 when the image formation (copying) by the image forming section 103 is indicated, and is supplied to the not illustrated place of storage or transmitted place via the corresponding interface when the storage or transmission to the not-illustrated external device is instructed.

When reading and image formation of the image information are instructed with respect to the object to be read O placed on the transparent glass 11 and the size of the transfer material to which the image formed is outputted differs from that of the object to be read O, the first and the second carriages 15, 16 of the image reader are moved at a reading speed with the size of the transfer material P set as a standard or that corresponding to the reading magnification previously entered.

Next description will be made on one example of the sheet-through mode that reads the image of the sheet-form original document using ADF 104 from the ready condition in which the first carriage 15 is located right below the white board 19 for compensation of shading.

When the user sets the object to be read O to the tray 104a of ADF 104 and turns on the reading START key not illustrated (or reading is instructed from an external device not illustrated), the illuminating lamp 13 of the first carriage 15 is turned on and the white board 19 is illuminated by the lamp 13 and the reflector 14. Consequently, the reflected light is generated from the white board 19 and the reflected light is guided to the lens 18 via the first image mirror 15a, the second image mirror 16a, and the third image mirror 16b, and is given the specified convergence by the lens 18, and the image is formed on the light-receiving surface of the CCD sensor 12.

Simultaneously, by the control of the motor driver 51, the driving motor 21 is rotated to move the first and the second carriages 15, 16 in the arrow B direction, and after it is continuously accelerated as it is, the driving motor 21 is stopped at the pulse number defined in such a manner that the center of the first mirror 15a length direction of the first carriage 15 (direction crossing at right angles in the depth direction) faces to the center of the length direction (direction crossing at right angles in the depth direction) of the reading window 20. The pulse number is defined as, for example, the distance between the HP sensor 22 and the light-shielding plate 22a of the first carriage 15, corrected in accord with the size of inertia torque of the driving motor 21, strength of brake, weight of the first and the second carriage, tension of wire rope 17 and the like, and set.

Now, since the section in which the first carriage 15 is moved while facing to the white board 19 is the section where the first carriage is accelerated, as described before, the reflected light from the white board 19 incidence on the light receiving surface of the CCD sensor is the varying areas illuminated per unit time. Consequently, the reflected light from the white board 19 incidence on the CCD sensor 12 is sampled at the timing described later using FIGS. 5A to 5D.

Then, the specified level of the output signal from the CCD sensor 12 is set as a threshold by the threshold circuit 61 and the compensation rate for shading compensation is established.

Thereafter, the feed roller 104b of ADF 104 is rotated and one sheet of the sheet-form object to be read O set to the tray 104a is taken out and conveyed to the reading position where the reading window 20 and conveyor roller 104c are located opposite to each other by the intermediate roller 104h and the conveyor roller 104c.

In this event, at the specified timing, for example, as soon as the rotation of the conveyor roller 104c begins, the illuminating lamp 13 of the first carriage 15 is turned on. Consequently, the sheet-form original document that is allowed to pass the reading position of the reading window 20 is illuminated by the illuminating light which is slender and of a band form in the depth direction from the illuminating lamp 13 and the reflector 14.

Simultaneously, the reflected light from the object to be read O is reflected successively at the first image mirror 15a, the second image mirror 16a, and the third image mirror 16b, and is given the specified convergence by the lens 18, and the image is formed successively on the light-receiving surface of the CCD sensor 12.

Thereafter, by the rotation of the conveyor roller 104c, the image of the sheet-form original document is allowed to pass successively the reading position of the reading window 20, the reflected light corresponding to the image of the whole area of the object to be read O is allowed to form successively an image on the light-receiving surface of the CCD sensor 12.

The reflected light from the object to be read O guided to the CCD sensor 12 is photoelectrically converted to the current value corresponding to the light intensity of the reflected light of the CCD sensor 12, and after the specified level of the current value is set as a threshold by the threshold circuit 61, the reflected light is converted to the voltage, and after the reflected light is recognized as the character information and image information through the profile correction circuit 62, character specifying circuit 63, and image processing circuit 64, and the like, the reflected light is stored in the work memory (RAM) 65 as the image data.

The image data stored in RAM65, as described in the flat bed mode, is supplied to the exposing device 105 when the image formation (copying) by the image forming section 103 is indicated, and is supplied to the not illustrated place of storage or transmitted place via the corresponding interface when the storage or transmission to the not-illustrated external device is instructed.

On the other hand, the object to be read O which is allowed to pass the reading window 20 is released from the contact with the reading window 20 at the pickup section 104e of ADF 104, and discharged to the object to be read holding section 104g through the claw 104 collapsed in advance in the solid line side. When the sheet-form object to be read O has images on both surfaces and both-surface reading for reading the images on both surfaces is instructed, by allowing the claw 104f to collapse to the broken line side by the control of the claw control section not illustrated, the sheet-form object to be read O is returned temporarily to the feed roller 104b side via the intermediate roller 104h, and again fed to the conveyor roller 104c, and the object to be read is thereby guided to the reading window 20 with the front and the back reversed.

If the second and after sheet-form objects to be read O exist, the sheet-form object to be read O is conveyed in the same manner.

As described above, the image reader of the flat bed type provided with the sheet-through mechanism according to the present invention is characterized in that the mirror which first receives the reflected light from the object to be read is located right below the white reference board which is the reference of "white" at the time of shading correction, and when the image data is obtained by the flat bed mode, the carriage that holds the mirror is moved to the transparent glass side on which the object to be read is placed, and when the image data is obtained by the sheet-through mode, the carriage holding the mirror is moved to the reading position side (opposite to the transparent glass) of the reading window which the object to be read is allowed to pass, and at the same time, the reflected light of "white" for correcting shading is obtained.

By the way, it is characterized in that the condition in which the mirror which first receives the reflected light from the object to be read faces to the white reference board 19 is designated at the home position of the carriages (15, 16).

Figure 6A:
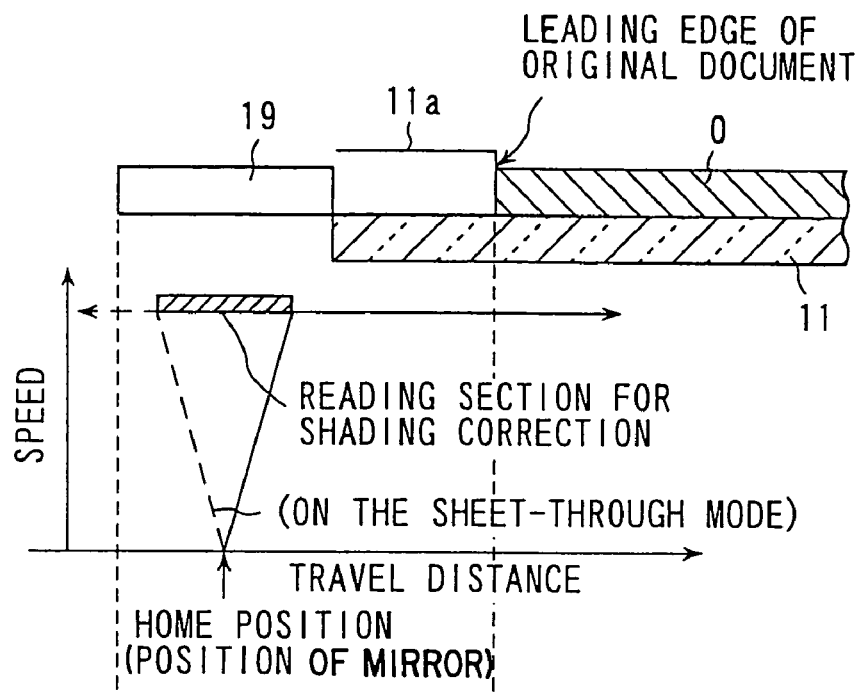
FIG. 6A is a schematic representation illustrating the first scan time in the image reader shown in FIGS. 2 and 3.
Figure 6B:
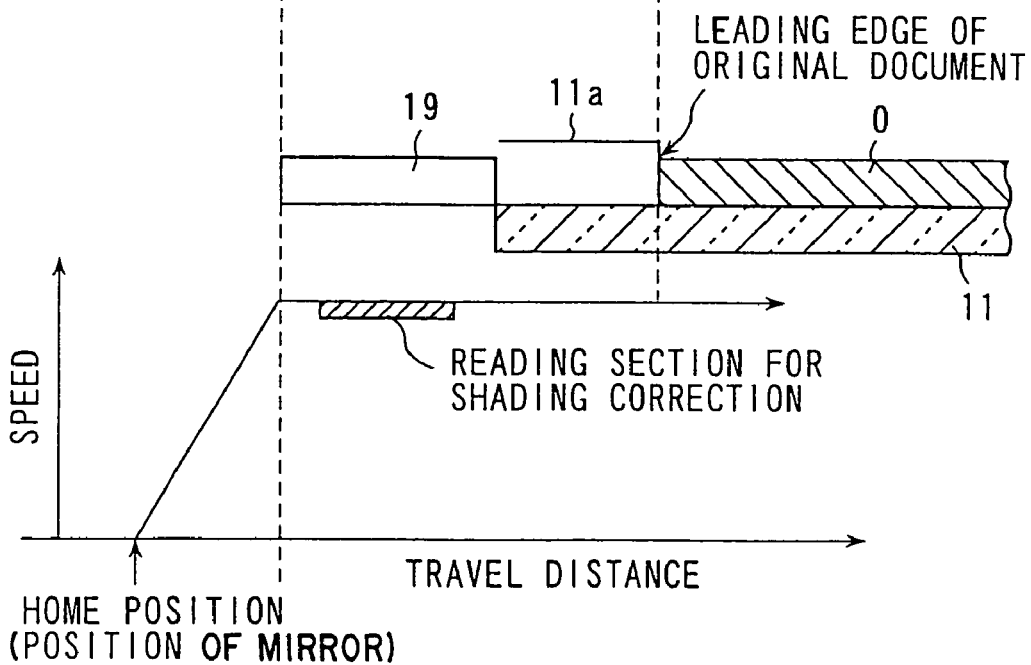
FIG. 6B is a schematic representation illustrating the first scan time in the known image reader.

Besides, since by arranging the white reference board 19 to be utilized as the home position of the carriages (15, 16), the distance between the carriage (home position) and the head end of the transparent glass on which the object to be read is placed (distance in which the carriage must travel) and the distance between the carriage (home position) at the time of reading of the sheet-through mode and the reading position of the reading window, that is, the distance in which the carriage must actually travel, are reduced in both systems, as shown in FIG. 6A, the first scanning time from when the reading of the object to be read is instructed (the reading start signal is entered) until when the reading of the first image to be read is shortened (FIG. 6B is a schematic representation explaining the acceleration of the carriage from the carriage position of the known image reader and the carriage speed while the reflected light is being received from the white board for shading correction).

By the way, because even when shading correction is able to be implemented by other independent routines, the distance between the head end of the transparent glass and the home position and that between the home position and the reading window are shortened, the size of the image reader 101 can be reduced.

Next discussed is the method for obtaining the reference for shading correction by accelerating and moving the first carriage provided with the first image mirror and the illuminating lamp in the section opposite to the white board.

FIG. 5A is a schematic representation explaining the principle for determining the correction value after the "white" reflected light is obtained for shading correction when the carriages are accelerated to move in conformity to the relevant reading systems before relevant readings of the flat bed mode and the sheet-through mode from the condition in which the first image mirror loaded on the first carriage is located right below the white reference board, which is the reference of "white" for shading correction in the image reader of the present invention shown in FIGS. 2 and 3.

As shown in FIG. 5A, when the first carriage 15 on which the first image mirror 15a and the light-shielding sheet 22a for HP sensor are installed at the specified positions, respectively, is moved by the driving motor 21, the relevant driving pulses from the drive start (initial pulse supply) to accelerating section (section in which the number of pulses is varied for acceleration) and uniform travel (uniform pulse supply for image reading) are supplied to the driving motor 21.

For example, the drive pulse width at the start of driving and at the acceleration section supplied to the driving motor 21 for moving the first carriage 15 in the distance equal to one line in the direction intersecting at right angles (hereinafter called the "sub-scanning direction") with the depth direction (hereinafter called the "main-scanning direction") using a driving motor whose reading resolution is 600 dpi (dot per inches) and the driving pulse width at the uniform speed travel is 0.1 ms (10000 pps) is varied to, for example, 2.828 ms (354 pps) at the start of driving and to 171 ms (854 pps) per next one line, and thereafter, reduced successively for every line, such as 0.899 ms (1113 pps), 0.758 ms (1320 pps), 0.668 ms (1497 pps), 0.604 ms (1656 pps), . . . , 0.1 ms (10000 pps) as the time passes (as the speed increases).

The timing at which the image signal is taken out from the CCD sensor 12, that is, the cycle of horizontal synchronous signal (H-SYNC) entered in the CCD sensor 12 is varied by the pulse width that agrees with the width of the driving pulse (see FIG. 5B) supplied to the driving motor 21 until the travel speed of the first carriage reaches the uniform speed as shown in FIG. 5D, that is, 2.828 ms, 1.171 ms, 0.899 ms, 0.758 ms, 0.668 ms, 0.604 ms, . . . 0.1 ms. In such event, the H-SYNC cycle is able to be easily set (changed) by calculating the travel time required per 1 line from the carriage weight and the acceleration that can be found from the wire rope and driving motor starting torque and the magnetizing system.

FIG. 5E shows intervals of horizontal synchronous signal (H-SYNC) to the CCD sensor in the known image reader, and is a constant interval that is matched to the final speed (uniform speed) of the carriage, unlike the H-SYNC signal to the CCD sensor according to the present invention shown in FIG. 5D.

Since the image reading time (H-SYNC cycle) per one line is same, when image signals are taken out from the CCD sensor using H-SYNC of constant intervals as shown in FIG. 5E, it has a problem in that the distance on the object to be read O to read the image becomes shorter than that at the uniform speed right after the start of acceleration. Consequently, while the acceleration is small, the width of one line on the object to be read O to be entered in the CCD sensor is extremely narrow and the averaging frequency for shading correction increases.

The above averaging is generally carried out for reducing influences of dirt and dust, but as in the case of the known image reader, there is a problem of conversely increasing influences of dust and dirt as the reading width itself is reduced. For example, when the shading correction value is set by obtaining the reflected light of the white board at the time of uniform speed, if the dust size is 2 μm×2 μm, the area ratio the dust accounts for per area of one pixel (42.3 μm×42.3 μm at 600 dpi) is about 0.2%. As against this, when the shading correction value is set by obtaining the reflected light of the white board, for example, at the speed 1/10 the uniform speed, since the width of nominal one pixel (in the sub-scanning direction distance) becomes 4.23 μm, the area ratio the dust of the size mentioned above accounts for per 1 pixel is about 2.2%.

Let "FF(hex)" denote white and "00(hex)" black, and if the concentration of white board is "FF(hex)" and the dust concentration is "00(hex)," the pixel concentration of the white board read is "FF(hex)" in the case of the former (at the time of uniform speed) and "FA(hex)" in the case of the latter (at the time of acceleration of the speed 1/10 the uniform speed), suggesting that the latter provides higher influence. In many image readers, in order to avoid averaging influence during the acceleration, in general, the white board for shading correction is located in the section where the carriage is moved at the uniform speed or the carriage moving speed is accelerated to the uniform speed before the white board and the carriage travel to the facing position. There is an image reader for reading the reflected light from the white board for shading correction, but in such event, the averaging frequency for averaging the reflected light data read from the white board must be increased, and as a result, the sub-scanning direction length of the white board increases.

As against this, in the image reader described referring to FIGS. 5B to 5D, the reference "white" level for shading correction is able to be found during the acceleration while the carriage is being accelerated without increasing the averaging frequency when the reflected light is read from the white board for shading correction.

When the carriage inertia weight is small and the carriage is accelerated to the uniform travel speed in a little time from the start of motor rotation by the start torque of the driving motor (step angle and exciting system), even though the white board is not installed near the end section of the transparent glass, it is not always necessary to read the reference "white" for shading correction as described above during the carriage acceleration (same as the known device, the reference "white" may be read in the section when the carriage is moved at the uniform travel speed).

In addition, by reading the reference "white" for shading correction by illuminating the white board while the carriage is being accelerated as explained referring to FIGS. 5B to 5D, it is possible to locate the acceleration start position (home position) closer to the side of the object to be read (transparent glass) as compared to the known image reader (FIG. 6B) which reads the reference "white" for shading correction when the carriage speed has reached the uniform speed as shown in FIG. 6A, and the first scan time from when the reading start is instructed (entry of reading start signal) to when reading of the image of the first original document is finished is shortened.

As described above, in the image reader of the flat bed type provided with the sheet-through mechanism according to the present invention, the first scan time from the start of reading the object to be read to the end of reading the first image of the object to be read can be shortened by designating the place right below the white reference board which is the reference of "white" at the time of shading correction as the home position where the mirror that first receives the reflected light from the object to be read is positioned, and when the image data is obtained by the flat bed mode, by moving the carriage holding the mirror the transparent glass side on which the object to be read is placed, and at the same time, when the image data is obtained by the sheet-through mode, by moving the carriage holding the mirror to the reading position side (opposite to the transparent glass) of the reading window where the object to be read is allowed to pass, and by obtaining the "white" reflected light which is the reference for shading correction at the time of acceleration when the carriages are moved to the relevant directions and while they are being moved opposite to the white reference board.

Even when the reference "white" level is required for shading correction during the acceleration in which the carriage whose travel is started is accelerated, the accurate threshold level is able to be set without increasing the averaging frequency when the reflected light from the white board is read for shading correction and without being subject to dirt and dust.

Furthermore, since the distance between the head end of the transparent glass and the distance between the home position and the reading window is shortened, the size of the image reader is reduced.]

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image forming apparatus, comprising:
   (i) a CCD sensor which converts an image of an object being read to image data of electrical signals; (ii) a transparent glass which holds the object being read; (iii) a mirror set including one or more mirrors, and movable along the transparent glass, which transmits the image of the object being read to the CCD sensor; (iv) an illuminating device configured to be moved along the transparent glass together with the mirror set, which illuminates the object being read held to the transparent glass; (v) a carriage member that supports the mirror set and the illuminating device, which moves at a specified speed along the transparent glass by external driving force, and which indicates an own position by a marker member mounted on its own specified position; (vi) a white reference element which provides white reflected light that serves as a reference to define a threshold level when the CCD sensor outputs the image data; (vii) a home position sensor which detects the marker element of the carriage member and sets the wait position of the mirror set and the illuminating device; (viii) a reading window arranged at a specified position in a direction away from the transparent glass with the white reference element set at the center in a plane defined by the white reference element as well as the transparent glass, which enables the image of the object being read to be transmitted to the CCD sensor through the mirror set by feeding of the object being read independently from the object being read set on the transparent glass; and (ix) a drive unit which drives the carriage member at a predetermined speed and sets the position of the carriage member in such a manner that, at the wait time, the reflected light from the white reference element is guided to the mirror of the mirror set supported on the carriage member, to which the reflected light from the object being read is a primary transmission;

an exposure unit which generates image light corresponding to the image data;

a photosensitive unit which generates an image corresponding to the image light generated by the exposure unit, and which holds the image; and a developing unit which visualizes the image held on the photosensitive unit by supplying a visualizing agent.

2. An image reader, comprising:

a charge-coupled device (CCD) sensor which converts an image of an object to be read into image data of electric signals;

a transparent glass which holds the object;

a mirror set including one or more mirrors, and movable along the transparent glass, which transmits the image of the object being read to the CCD sensor;

an illuminating device which is moved along the transparent glass together with the mirror set, and illuminates the object held by the transparent glass;

a carriage member which supports the mirror set and the illuminating device, which is moved at a specified speed along the transparent glass by external driving force, which indicates an own position with a marker member mounted on its own specified position;

a white reference element which provides white reflected light that serves as a reference to determine a threshold level when the CCD sensor outputs the image data;

a stepping motor which is driven by a driving signal to move the carriage member; and a control unit which controls the driving signal and an H-SYNC signal to be input to the CCD sensor, wherein when the CCD sensor reads the white reference element, the control unit changes a period of the H-SYNC signal in accordance with a number of pulses of the driving signal to drive the stepping motor.

3. The image reader according to claim 2, further comprising:

a home position sensor which detects the marker member of the carriage member and sets the wait position of the mirror set and the illuminating device, wherein the home position of the carrier member is set to a position in which the white reference element is allowed to be read.

4. A method for reading an image, comprising:

detecting a position of the illuminating unit with a marker member mounted on a specified position of the illuminating unit;

determining a threshold level when a charge-coupled device (CCD) sensor outputs the image data as data obtained by reading a white reference element;

controlling a driving signal for driving a stepping motor and an H-SYNC signal to be input to the CCD sensor, moving an illuminating unit along a transparent glass; and illuminating an object to be read, held by the transparent glass, wherein when the CCD sensor reads the white reference element, the control unit changes a period of the H-SYNC signal in accordance with a number of pulses of the driving signal for driving the stepping motor.

5. The image reader according to claim 4, further comprising:

shifting a position to start moving the illuminating unit which is moved to a position in that the white reference element is allowed to be read.

* * * * *